US011656537B2

(12) United States Patent
Okada

(10) Patent No.: US 11,656,537 B2
(45) Date of Patent: May 23, 2023

(54) LENS APPARATUS AND IMAGE PICKUP SYSTEM

(71) Applicant: CANON KABUSHIKI KAISHA, Tokyo (JP)

(72) Inventor: Koji Okada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/839,944

(22) Filed: Jun. 14, 2022

(65) Prior Publication Data

US 2022/0308424 A1 Sep. 29, 2022

Related U.S. Application Data

(63) Continuation of application No. 17/082,109, filed on Oct. 28, 2020, now Pat. No. 11,385,527.

(30) Foreign Application Priority Data

Oct. 30, 2019 (JP) ............................ JP2019-197785

(51) Int. Cl.
*G03B 17/14* (2021.01)
*H04N 5/225* (2006.01)
(Continued)

(52) U.S. Cl.
CPC ............. *G03B 17/14* (2013.01); *H04N 23/54* (2023.01); *H04N 23/55* (2023.01); *G02B 7/021* (2013.01)

(58) Field of Classification Search
CPC .. G03B 17/14; G03B 2206/00; G03B 17/565; H04N 5/2253; H04N 5/2254;
(Continued)

(56) References Cited

U.S. PATENT DOCUMENTS 6,717,618 B1 * 4/2004 Yoshikawa ........ H04N 5/23209 348/347
8,708,585 B2 4/2014 Osawa
(Continued)

FOREIGN PATENT DOCUMENTS

CN 101227561 A 7/2008
CN 104104848 A 10/2014
(Continued)

OTHER PUBLICATIONS

Extended European Search Report issued in European Appln. No. 20204395.6 dated Feb. 16, 2021.
(Continued)

*Primary Examiner* — Chiawei Chen
(74) *Attorney, Agent, or Firm* — Rossi, Kimms & McDowell LLP

(57) ABSTRACT

A lens apparatus attachable to and detachable from an image pickup apparatus includes an imaging optical system, a first-shaped mount part, and a communicator. A first lens apparatus includes a mount part engageable with the mount part of the image pickup apparatus, and is communicable with the image pickup apparatus using a first communication method. A second lens apparatus includes a second-shaped mount part that is not engageable with the mount part of the image pickup apparatus, and the second lens apparatus is attachable to the image pickup apparatus via the intermediate adapter, and is communicable with the image pickup apparatus using a second communication method different from the first communication method. The communicator is communicable with the image pickup apparatus using the second communication method, and uncommunicable with the image pickup apparatus using the first communication method.

19 Claims, 10 Drawing Sheets

10
100
500
550a
550b
280
200
250
180
150
550a
500
550b
680
600
650
400
380
300
450a
450b
350

(51) Int. Cl.
*G02B 7/02* (2021.01)
*H04N 23/54* (2023.01)
*H04N 23/55* (2023.01)

(58) Field of Classification Search
CPC ............. H04N 5/2251; H04N 5/23209; H04N 5/23241; H04N 23/54; H04N 23/55; H04N 23/50; H04N 23/65; H04N 23/663; G02B 7/021; G02B 7/02; G02B 7/14
See application file for complete search history.

(56) References Cited

U.S. PATENT DOCUMENTS 9,164,256 B2 * 10/2015 Hasegawa ................ G02B 9/60
2011/0044682 A1 * 2/2011 Kawanami ........... H04N 23/663 396/439
2011/0299847 A1 12/2011 Sakamoto
2012/0155853 A1 6/2012 Osawa
2013/0028590 A1 * 1/2013 Hasuda .................. G03B 17/14 396/530
2014/0022434 A1 * 1/2014 Morita ................. H04N 5/2353 348/333.04
2014/0152777 A1 * 6/2014 Galor ................... H04N 17/002 348/47
2014/0160304 A1 * 6/2014 Galor ............... H04N 5/232933 348/207.1
2015/0070521 A1 * 3/2015 Yasuda ................ G03B 17/565 348/211.1
2016/0037050 A1 * 2/2016 Irie .................. H04N 5/232935 348/207.1
2018/0027169 A1 * 1/2018 Seki ....................... G03B 17/14 348/211.1
2018/0224720 A1 * 8/2018 Pan ...................... H04N 5/2254
2018/0348605 A1 * 12/2018 Fujihashi ........... H01R 13/2471
2018/0352140 A1 * 12/2018 Tsukamoto .......... H04N 5/2254
2019/0306392 A1 * 10/2019 Imamura .................. G02B 7/02

FOREIGN PATENT DOCUMENTS

| | | | |
|---|---|---|---|
| CN | 106681082 | A | 5/2017 |
| CN | 108668073 | A | 10/2018 |
| EP | 2367350 | A1 | 9/2011 |
| EP | 2367350 | B1 | 8/2015 |
| EP | 3410197 | A1 | 12/2018 |
| JP | 2012128203 | A | 7/2012 |

OTHER PUBLICATIONS

Notice of Allowance issued in U.S. Appl. No. 17/082,109 dated Mar. 30, 2022.
Office Action issued in European Appln. No. 20204395.6 dated Aug. 18, 2022.
Office Action issued in Chinese Appln. No. 202011162637.2 dated Nov. 30, 2022. English translation provided.

* cited by examiner

LENS APPARATUS AND IMAGE PICKUP SYSTEM

BACKGROUND OF THE INVENTION

Field of the Invention

The present invention relates to a lens apparatus attachable to and detachable from an image pickup apparatus.

Description of the Related Art

In an interchangeable lens type camera system, an old type interchangeable lens and a new type interchangeable lens may be detachably attached to the camera. Thus, the camera is required to be compatible with the specification of any type of the interchangeable lens.

Japanese Patent Laid-Open No. 2012-128203 discloses a camera that switches a communication method according to the type of the attached interchangeable lens when the old type interchangeable lens and the new type interchangeable lens support different communication methods.

An interchangeable lens for a mirrorless camera has recently been proposed, which has a backfocus shorter than that of the conventional interchangeable lens. The shortened backfocus improves the design freedom for the overall lens length more effectively than an optical system having a long backfocus, and consequently enables various aberrations to be easily corrected. There is also proposed a camera system etc. that provides an old type communication method to an interchangeable lens having a long backfocus and a new type communication method to an interchangeable lens having a short backfocus.

However, the interchangeable lenses for mirrorless cameras do not always need the new type communication method. For example, macro lenses or ultrawide-angle lenses do not require the autofocus (AF) speed or the followability to a dynamic object more frequently than telephoto lenses for sports photography, and thus do not require a higher communication speed of the new type communication method (higher communication performance). In addition, since a semiconductor chip equipped with a high-performance CPU compatible with the new type communication method is likely to have a footprint larger than that of a semiconductor chip equipped with a CPU compatible with the old type communication method, a design freedom of an optical system (degree of freedom of the optical design) may be narrowed.

SUMMARY OF THE INVENTION

The present invention provides a lens apparatus and an image pickup system, each of which can improve both an optical design freedom and a communication performance.

A lens apparatus attachable to and detachable from an image pickup apparatus includes an imaging optical system, a first-shaped mount part engageable with a mount part of the image pickup apparatus, and a communicator communicable with the image pickup apparatus. Any one of a plurality of lens apparatuses including a first lens apparatus and a second lens apparatus is attachable to and detachable from the image pickup apparatus directly or via an intermediate adapter. The first lens apparatus includes a mount part engageable with the mount part of the image pickup apparatus, and is communicable with the image pickup apparatus using a first communication method. The second lens apparatus includes a second-shaped mount part that is not engageable with the mount part of the image pickup apparatus, and the second lens apparatus is attachable to the image pickup apparatus via the intermediate adapter, and is communicable with the image pickup apparatus using a second communication method different from the first communication method. The communicator is communicable with the image pickup apparatus using the second communication method, and uncommunicable with the image pickup apparatus using the first communication method.

An image pickup system including the above lens apparatus also constitutes another aspect of the present invention.

Further features of the present invention will become apparent from the following description of exemplary embodiments with reference to the attached drawings.

DESCRIPTION OF THE EMBODIMENTS

Figure 1:
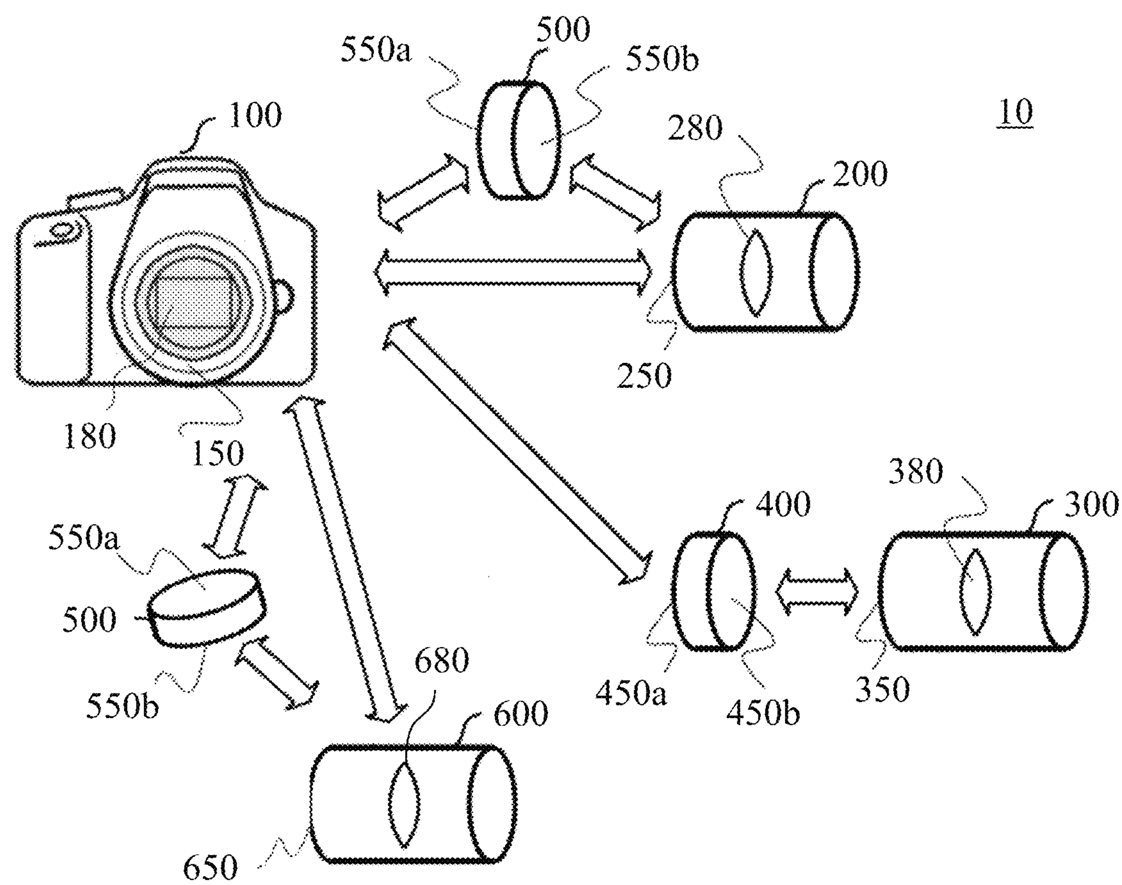
FIG. 1 explains a camera system according to this embodiment.

Referring now to the accompanying drawings, a detailed description will be given of embodiments according to the present invention.

Before an embodiment according to the present invention is described, terms used in this specification will be described. In this specification, the mount part (or unit) is a connector provided to each of a camera (image pickup apparatus), an intermediate adapter, and an interchangeable lens (lens apparatus). Each mount part has a plurality of electrical contacts, and when the intermediate adapter or the interchangeable lens is attached to (or mounted on) the camera, the electrical contacts provided on the mount parts contact each other. In other words, the mount part has not only a function of mechanically connecting the camera and the adapter or the interchangeable lens to each other, but also a function of electrically connecting them to each other.

A backfocus refers to an air conversion length from a lens surface closest to the image plane of the imaging optical system to the image plane. A flange back refers to a distance from a mount reference surface of the mount part of the camera to an imaging plane of an image sensor (image pickup element) built in the camera. In other words, the flange back is a distance from the mount reference plane of the mount part on the interchangeable lens to the image plane.

Referring now to the accompanying drawings, a detailed description will be given of an interchangeable lens according to this embodiment. In each figure, the same components are designated by the same reference numerals, and a duplicate description thereof will be omitted.

Camera System

Referring now to FIG. 1, a description will be given of a camera system according to this embodiment. FIG. 1 is an explanatory diagram of a camera system (image pickup system) 10, and illustrates a mutual relationship among a camera (image pickup apparatus) 100, interchangeable lenses (lens apparatuses) 200, 300, and 600, and intermediate adapters 400 and 500. The apparatuses indicated by arrows in FIG. 1 indicate that the mount parts of the apparatuses are connectable and attachable. The interchangeable lenses 200 and 600 are directly attachable to and detachable from the camera 100. The interchangeable lens 300 is indirectly attachable to and detachable from the camera 100 via the intermediate adapter 400. As described above, the camera system 10 includes at least the camera 100 and one of the interchangeable lenses 200, 300, and 600. The camera system 10 may include accessories such as the intermediate adapters 400 and 500.

The camera 100 has an image sensor 180 such as a CMOS sensor. The image sensor 180 photoelectrically converts an object image (optical image) formed by an imaging optical system in the interchangeable lens (such as any of the interchangeable lenses 200, 300, and 600) mounted on the camera 100, and outputs an electric signal (image data).

The interchangeable lens (first lens apparatus) 200 has an imaging optical system 280 that forms an object image, and is attachable to the camera 100 directly or via the intermediate adapter 500. Here, a mount part 250 of the interchangeable lens 200 and a mount part 550*a* of the intermediate adapter 500 are each serves as a first-shaped mount part engageable with the mount part 150 of the camera 100. A mount part 550*b* of the intermediate adapter 500 has the same shape as the mount part 150.

The interchangeable lens (second lens apparatus) 300 has an imaging optical system 380 that forms an object image, and is not directly attachable to the camera 100. A mount part 350 of the interchangeable lens 300 is a second-shaped mount part that is not engageable with the mount part 150 of the camera 100. Therefore, the interchangeable lens 300 is attached to the camera 100 via the intermediate adapter 400 having a mount 450*a* engageable with the mount part 150 and the mount 450*b* engageable with the mount 350.

The interchangeable lens (third lens apparatus) 600 has an imaging optical system 680 that forms an object image, and is attachable to the camera 100 directly or via the intermediate adapter 500. A mount part 650 of the interchangeable lens 600 is also a first-shaped mount part that is engageable with the mount part 150 of the camera 100.

The camera 100 according to this embodiment is a so-called mirrorless type camera in which a quick return mirror or a half mirror is not disposed on the optical path. The imaging optical systems 280 and 680 are so-called short-back optical systems designed for the camera 100. The imaging optical system 380 may be an optical system designed for the camera in which a mirror is disposed on the optical path. A backfocus d1 [mm] (backfocus at the wide-angle end when the imaging optical system 280 is a zoom lens) and a flange back d2 [mm] of the imaging optical system 680 may satisfy at least one of the following conditional expressions (1) and (2):

$$10 \le d1 \le 30 \quad (1)$$

$$14 \le d2 \le 22 \quad (2)$$

Satisfying at least one of the conditional expressions (1) and (2) can improve the optical design freedom of each of the imaging optical systems 280 and 680, and provide an imaging optical system in which various aberrations are satisfactorily corrected.

Structure of Mount Part

Figure 2A:
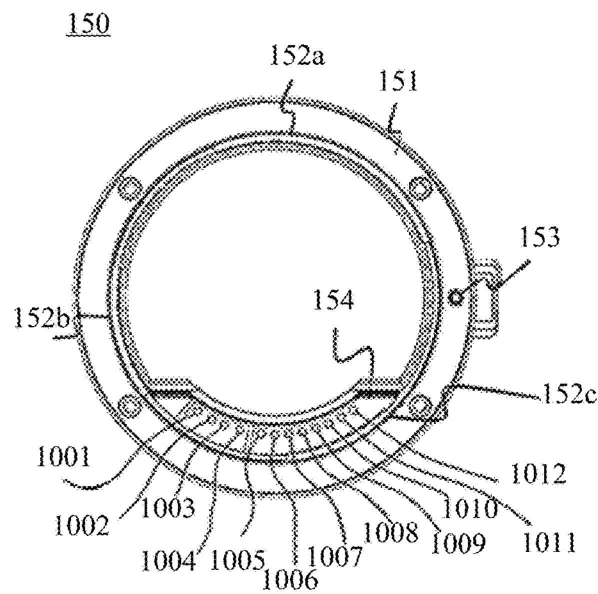
FIGS. 2A to 2D illustrate a structure of a mount part according to this embodiment.
Figure 2B:
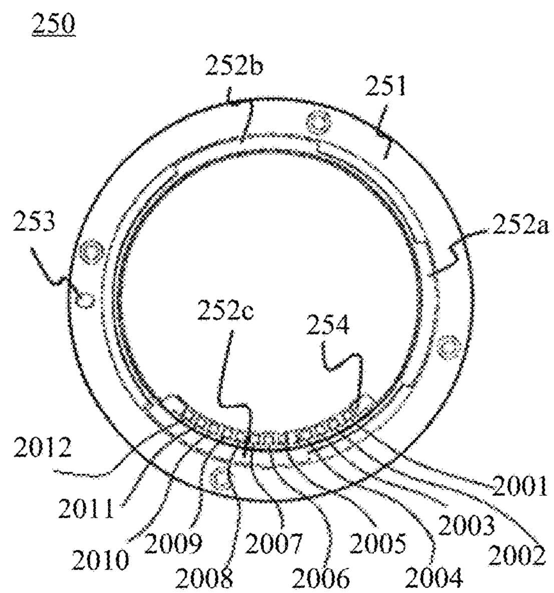
Figure 2C:
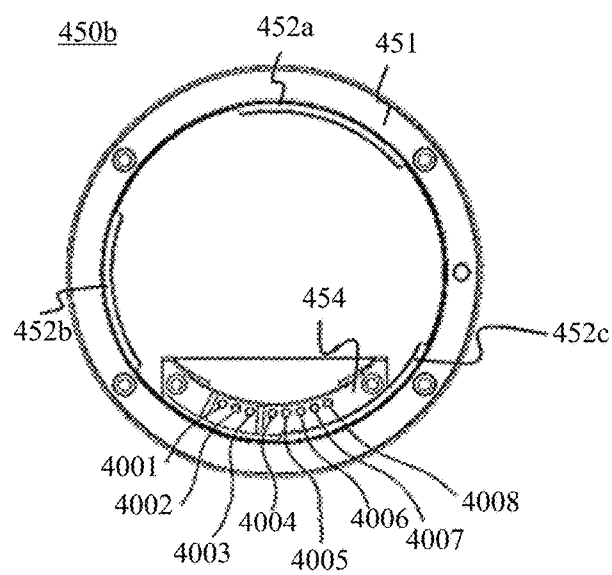
Figure 2D:
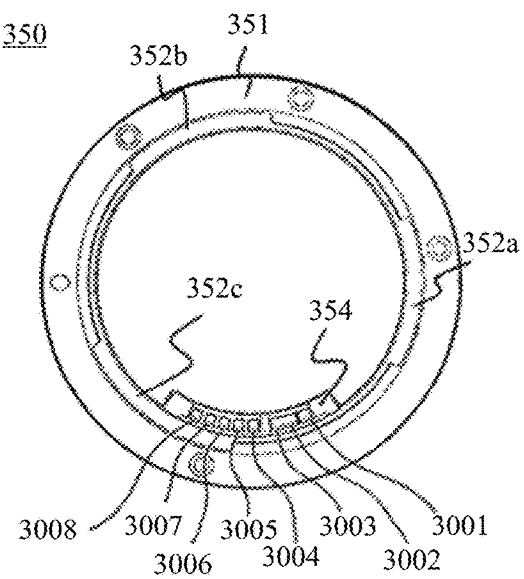

Referring now to FIGS. 2A to 2D, a description will be given of a structure of the mount parts 150, 250, 450*b*, and 350. FIGS. 2A to 2D are structural diagrams of the mount parts 150, 250, 450*b*, and 350, respectively. FIG. 2A illustrates the mount part 150 on the camera 100 viewed from the object side. FIG. 2B illustrates the mount part 250 on the interchangeable lens 200 viewed from the image side. FIG. 2C illustrates the mount part 450*b* on the intermediate adapter 400 viewed from the object side. FIG. 2D illustrates the mount part 350 on the interchangeable lens 300 viewed from the image side.

The mount part 150 illustrated in FIG. 2A includes a ring-shaped mount reference surface 151 for ensuring a predetermined flange back. Bayonet claws 152*a*, 152*b*, 152*c* are provided inside the mount reference surface 151 at three locations in the circumferential direction. The mount part 150 has a positioning lock pin 153 in bayonetting the opposite mount parts (250, 450*a*, 550*a*, and 650) onto the mount part 150 so that the lock pin 153 can project and draw from the mount reference surface 151. When the mount part 150 and the mount part of the intermediate adapter 500 or the interchangeable lenses 200 and 600 relatively rotate up to the mounting completion positions, the engagement holes provided in these mount parts engage with the lock pin 153.

A camera-side contact holder 154 is provided in the area inside the bayonet claws 152*a*, 152*b*, and 152*c*. The camera-side contact holder 154 holds electrical contacts (camera-side electrical contacts) 1001 to 1012. The mount part 550*b* has the same structure as the mount part 150 illustrated in FIG. 2A.

The mount part 250 illustrated in FIG. 2B has a ring-shaped mount reference surface 251 which is a reference surface of the flange back. Bayonet claws 252*a*, 252*b*, and 252*c* are provided inside the mount reference surface 251 at three locations in the circumferential direction. The mount part 250 has an engagement hole 253. The engagement hole 253 is engaged with the lock pin 153 when the mounting of the interchangeable lens 200 on the camera 100 is completed. A contact holder 254 is provided in an area inside the bayonet claws 252*a*, 252*b*, and 252*c*. The contact holder 254 holds the electrical contacts 2001 to 2012. Each of the mount parts 450*a*, 550*a*, and 650 has the same structure as that of the mount part 250 illustrated in FIG. 2B.

The mount part 450*b* illustrated in FIG. 2C has a mount reference surface 451, bayonet claws 452*a*, 452*b*, and 452*c*, and a contact holder 454, similar to the mount part 150. However, the lengths of the bayonet claws 452*a*, 452*b*, and 452*c* and the intervals between the bayonet claws are different from those of the bayonet claws 152*a*, 152*b*, and 152*c* in the mount part 150.

The mount part 350 illustrated in FIG. 2D has a mount reference surface 351, bayonet claws 352*a*, 352*b*, and 352*c*, and a contact holder 354, similar to the mount part 250. However, the lengths of the bayonet claws 352*a*, 352*b*, and 352*c* and the intervals between the adjacent bayonet claws are different from those of the bayonet claws 252*a*, 252*b*, and 252*c* of the mount part 250. Each electrical contact illustrated in FIGS. 2A to 2D may have either a pin shape or a contact piece as long as it can carry electricity.

Circuit Configuration

Figure 3:
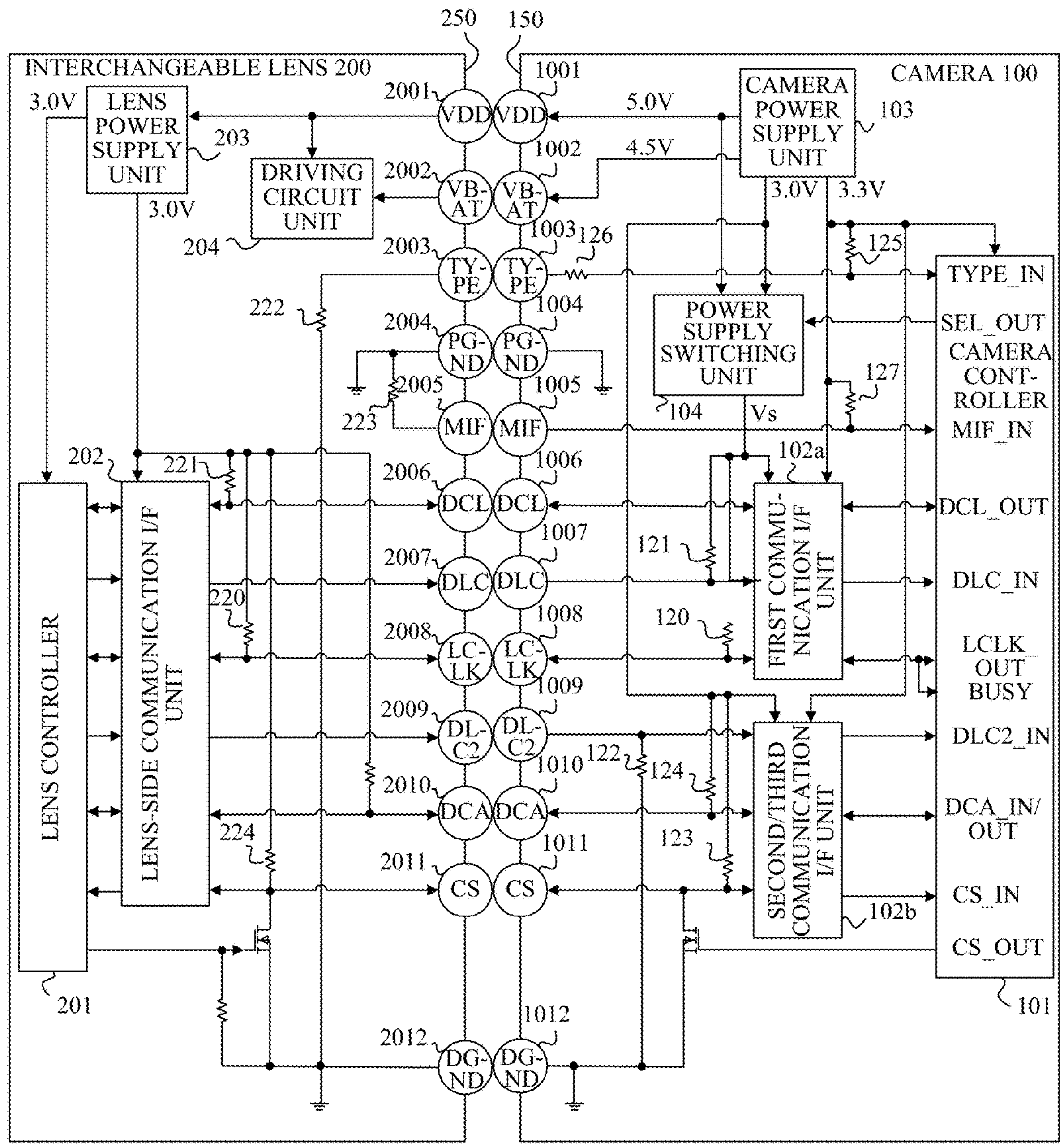
FIG. 3 illustrates circuit configurations of a camera and a first lens apparatus according to this embodiment.

Referring now to FIG. 3, a description will be given of the interchangeable lens 200 that is attached to the camera 100. FIG. 3 is a circuit configuration diagram of the camera 100 and the interchangeable lens (first lens apparatus) 200, and illustrates the interchangeable lens 200 that is connected to the camera 100. The interchangeable lens 200 and the camera 100 can communicate with each other via a communication path formed by a part of a plurality of electrical contacts provided on the mount parts 150 and 250. The interchangeable lens 200 and the camera 100 can perform a first communication, a second communication, and a third communication, which will be described later. The first communication is performed by a clock synchronous communication (second communication method) or an asynchronous communication (first communication method).

A camera controller (communicator) 101 controls an output of the electrical contact provided to the mount part 150, and processes a signal input to the electrical contact, thereby controlling communications between the interchangeable lenses 200, 400, 600, etc. mounted on the camera 100 and the camera 100. A camera power supply unit 103 is a power supply used to operate each component in the camera 100, and an interchangeable lens and an intermediate adapter attached to the camera 100. The camera power supply unit 103 can generate a plurality of different voltages, and supplies power of each voltage to each component in the camera 100, the interchangeable lens and the intermediate adapter attached to the camera 100. A power supply switching unit 104 supplies power to a first communication I/F (interface) unit 102*a*. The power supply switching unit 104 is supplied with two power supplies having different voltage values from the power supply unit 103, and switches the power supply to the first communication I/F (interface) unit 102*a* under the control of the camera controller 101.

A lens controller 201 controls an output of an electrical contact provided to the mount part 250 and processes a signal input to the electrical contact, thereby controlling communications between the camera 100 and the interchangeable lens 200. A lens power supply unit 203 generates a power supply of a predetermined voltage from the power supply supplied from the camera 100 and supplies the power supply to the lens controller 201 and a lens-side communication I/F unit 202.

The electrical contacts 1001 and 2001 are terminals used to supply power (control power) mainly used for communications performed between the camera 100 and the interchangeable lens 200 and other control calculations, from the power supply unit 103 of the camera 100 to the interchangeable lens 200. The electrical contacts 1001 and 2001 will also be referred to as VDD terminals 1001 and 2001 hereinafter. In this embodiment, the voltage (VDD voltage) of power supplied to the interchangeable lens 200 by the VDD terminal 1001 is 5.0V.

The electrical contacts 1002 and 2002 are terminals mainly used to supply power (driving power) used for the operation of a driving system (driving circuit unit 204) such as a motor, from the camera 100 to the interchangeable lens 200. The electrical contacts 1002 and 2002 will also be referred to as VBAT terminals 1002 and 2002 hereinafter. In this embodiment, the voltage of power supplied to the interchangeable lens 200 by the VBAT terminal 1002 is 4.5V. The VDD terminal and the VBAT terminal are collectively referred to as a power supply system terminal.

The electrical contacts 1012 and 2012 are terminals for grounding the communication control system circuits of the camera 100 and the interchangeable lens 200 or ground terminals corresponding to the VDD terminal. The electrical contacts 1012 and 2012 will also be referred to as DGND terminals 1012 and 2012 hereinafter.

The electrical contacts 1004 and 2004 are terminals for grounding a driving system circuit including a motor and the like provided to the camera 100 and the interchangeable lens 200 or ground terminals corresponding to the VBAT terminal. The electrical contacts 1004 and 2004 will also be referred to as PGND terminals 1004 and 2004 hereinafter. The DGND terminal and the PGND terminal will be collectively referred to as a ground terminal.

The electrical contacts 1005 and 2005 are terminals for detecting that the interchangeable lens 200 is attached to the camera 100. The camera controller 101 detects an attachment and a detachment of the interchangeable lens 200 to and from the camera 100 based on the voltage level of the electrical contact 1005. When the camera controller 101 detects the attachment of the interchangeable lens, the power supply to the interchangeable lens 200 is started via the VDD terminal 1001 and the VBAT terminal 1002. The electrical contacts 1005 and 2005 will also be referred to as MIF terminals 1005 and 2005 hereinafter.

The electrical contact (first electrical contact) 1003 and the electrical contact 2003 are terminals for enabling the type of the interchangeable lens directly or indirectly attached to the camera 100 via an intermediate adapter, to be determined. The electrical contacts 1003 and 2003 will also be referred to as TYPE terminals. A method for determining the type will be described later.

The electrical contacts 1006 to 1008 and 2006 to 2008 are terminals used for the first communication. The first communication is a communication performed between the camera 100 and the interchangeable lens 200, and transmits/receives ID information (individual information) of the interchangeable lens 200, information necessary for image capturing, control instructions, and the like. The electrical contacts 2006 and 2008 are pulled up to 3.0 V in the interchangeable lens 200. The electrical contacts 1007 and 1008 are pulled up to 3.0V in the camera 100. Thereby, the communication voltage of the first communication becomes 3.0V (first voltage).

The electrical contacts 1009 and 2009 are terminals used for the second communication. The second communication is a communication for unidirectionally transmitting data from the interchangeable lens 200 to the camera 100. The communication voltage of the second communication is 3.0 V, which is the same as the driving voltage of the lens-side communication I/F unit 202.

The electrical contacts 1010, 1011, 2010, and 2011 are terminals used for the third communication. The third communication is a communication performed between the camera 100 and the interchangeable lens 200, and a communication mutually performed among the camera 100, the interchangeable lens 200, and the intermediate adapter 500, when the intermediate adapter 500 is connected. The electrical contacts 1010 and 1011 are pulled up in the camera 100. Thereby, the communication voltage of the third communication is 3.0V.

Figure 4:
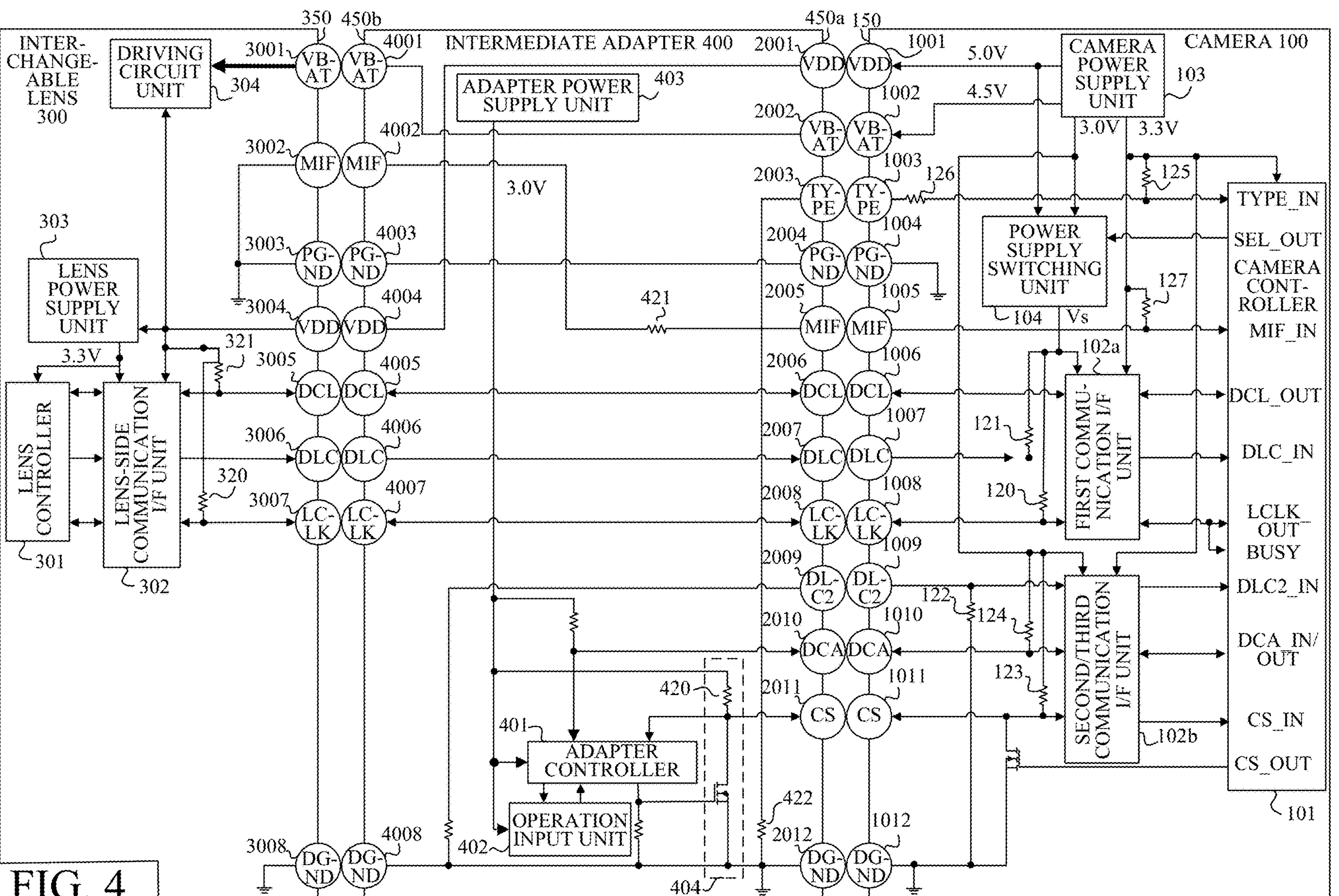
FIG. 4 illustrates circuit configurations of the camera, an intermediate adapter, and a second lens apparatus according to this embodiment.

Referring now to FIG. 4, a description will be given of the interchangeable lens 300 that is attached to the camera 100 via the intermediate adapter 400. FIG. 4 is a circuit configuration diagram of the camera 100, the intermediate adapter 400, and the interchangeable lens (second lens apparatus) 300, and illustrates the interchangeable lens 300 that is attached to the camera 100 via the intermediate adapter 400.

The interchangeable lens 300 cannot perform the second communication or the third communication with the camera 100, but can perform the first communication. The first communication is performed by the clock synchronous communication. The intermediate adapter 400 has an adapter controller 401 that communicates with the camera 100 and performs processing according to the operation of an unillustrated operation member. The operation of the operation member is transmitted to the adapter controller 401 via an operation input unit 402.

The mount part 450*a* is similar to the mount part 250 of the interchangeable lens 200 described above. However, the internal circuit of the intermediate adapter 400 and that of the interchangeable lens 200 are different from each other. More specifically, the DCL terminal 2006, the DLC terminal 2007, and the LCLK terminal 2008 used for the first communication are not connected to the adapter controller 401 in the intermediate adapter 400, and are through-wired to the corresponding electrical contacts of the mount part 450*b*. On the other hand, the DCA terminal 2010 and the CS terminal 2011 used for the third communication are connected to the adapter controller 401 in the intermediate adapter 400.

The DLC2 terminal 2009 used for the second communication is pulled down to the same level as the DGND terminal 2012 via a resistor in the intermediate adapter 400. This is because the interchangeable lens 300 and the camera 100 perform no second communication.

The TYPE terminal 2003 is pulled down to the same level as the DGND terminal 2012 via a resistor 422 in the intermediate adapter 400. The resistor 422 has a resistance value different from that of a resistor 222 in the interchangeable lens 200. Thereby, the voltage of the electrical contact (TYPE terminal) 1003 can be made different between when the interchangeable lens 300 is attached to the camera 100 via the intermediate adapter 400 and when the interchangeable lens 200 is attached.

Next follows a description of the electrical contacts provided to the mount parts 450*b* and 350. The electrical contacts 3001 and 4001 are terminals used to supply power (driving power) used for the operation of a driving system (driving circuit unit 304) such as a motor, from the VBAT terminal 1002 of the camera 100 to the interchangeable lens 300. In the intermediate adapter 400, the VBAT terminal 2002 is through-wired to the electrical contact 4001. The electrical contacts 3001 and 4001 will also be referred to as VBAT terminals 3001 and 4001 hereinafter. In this embodiment, the voltage of power supplied to the interchangeable lens 300 by the VBAT terminal 1002 is 4.5V.

The electrical contacts 3004 and 4004 are terminals used to supply control power from the VDD terminal 1001 of the camera 100 to the interchangeable lens 300. In the intermediate adapter 400, the VDD terminal 2001 is through-wired to the electrical contact 4004 and is also connected to an adapter power supply unit 403 in the intermediate adapter 400. The adapter power supply unit 403 generates a 3.0 V power supply as the power supply to the adapter controller 401 and the operation input unit 402. The electrical contacts 3004 and 4004 will also be referred to as VDD terminals 3004 and 4004 hereinafter. In this embodiment, the voltage of power supplied to the interchangeable lens 300 by the VDD terminal 1001 is 5.0V.

The electrical contacts 3003 and 4003 are terminals for grounding the driving systems of the camera 100 and the interchangeable lens 300 or ground terminals corresponding to the VBAT terminal. In the intermediate adapter 400, the PGND terminal 2004 is through-wired to the electrical contact 4003. The electrical contacts 3003 and 4003 will also be referred to as the PGND terminals 3003 and 4003 hereinafter.

The electrical contacts 3008 and 4008 are terminals for grounding the communication control systems in the camera 100 and the interchangeable lens 300 or ground terminals corresponding to the VDD terminal. In the intermediate adapter 400, the DNG terminal 2012 is through-wired to the electrical contact 4008. The electrical contacts 3008 and 4008 will also be referred to as DGND terminals 3008 and 4008 hereinafter.

The electrical contacts 3002 and 4002 are terminals used to detect that the interchangeable lens 300 is attached to the camera 100 via the intermediate adapter 400. When detecting attachment of the interchangeable lens 300, the camera controller 101 starts supplying power to the interchangeable lens 300. In the intermediate adapter 400, the MIF terminal 2005 is through-wired to the electrical contact 4002. The electrical contacts 3002 and 4002 will also be referred to as the MIF terminals 3002 and 4002 hereinafter.

The electrical contacts 3005 to 3007 and 4005 to 4007 are terminals used for the first communication described later. Inputs and outputs of the electrical contacts 3005 to 3007 are controlled by a lens controller 301 via a lens-side communication I/F unit 302. The electrical contacts 3005, 3006, and 3007 will also be referred to as a DCL terminal 3005, a DLC terminal 3006, and an LCLK terminal 3007 hereinafter. The electrical contacts 4005, 4006, and 4007 will also be referred to as a DCL terminal 4005, a DLC terminal 4006, and an LCLK terminal 4007 hereinafter.

When the interchangeable lens 300 is attached via the intermediate adapter 400, the interface voltages of the first communication I/F unit 102*a* and the lens-side communication I/F unit 302 are set to the same voltage supplied from the VDD terminal as 5.0V (second voltage). The second voltage is a voltage different from the first voltage.

On the other hand, the interface voltage of the second/third communication I/F unit 102*b* is set to 3.0V. In other words, when the interchangeable lens 300 is attached to the camera 100 via the intermediate adapter 400, the communication voltage for the first communication and that for the third communication are different from each other. As described later, when the interchangeable lens 300 is attached to the camera 100 via the intermediate adapter 400, no second communication is performed.

Figure 5:
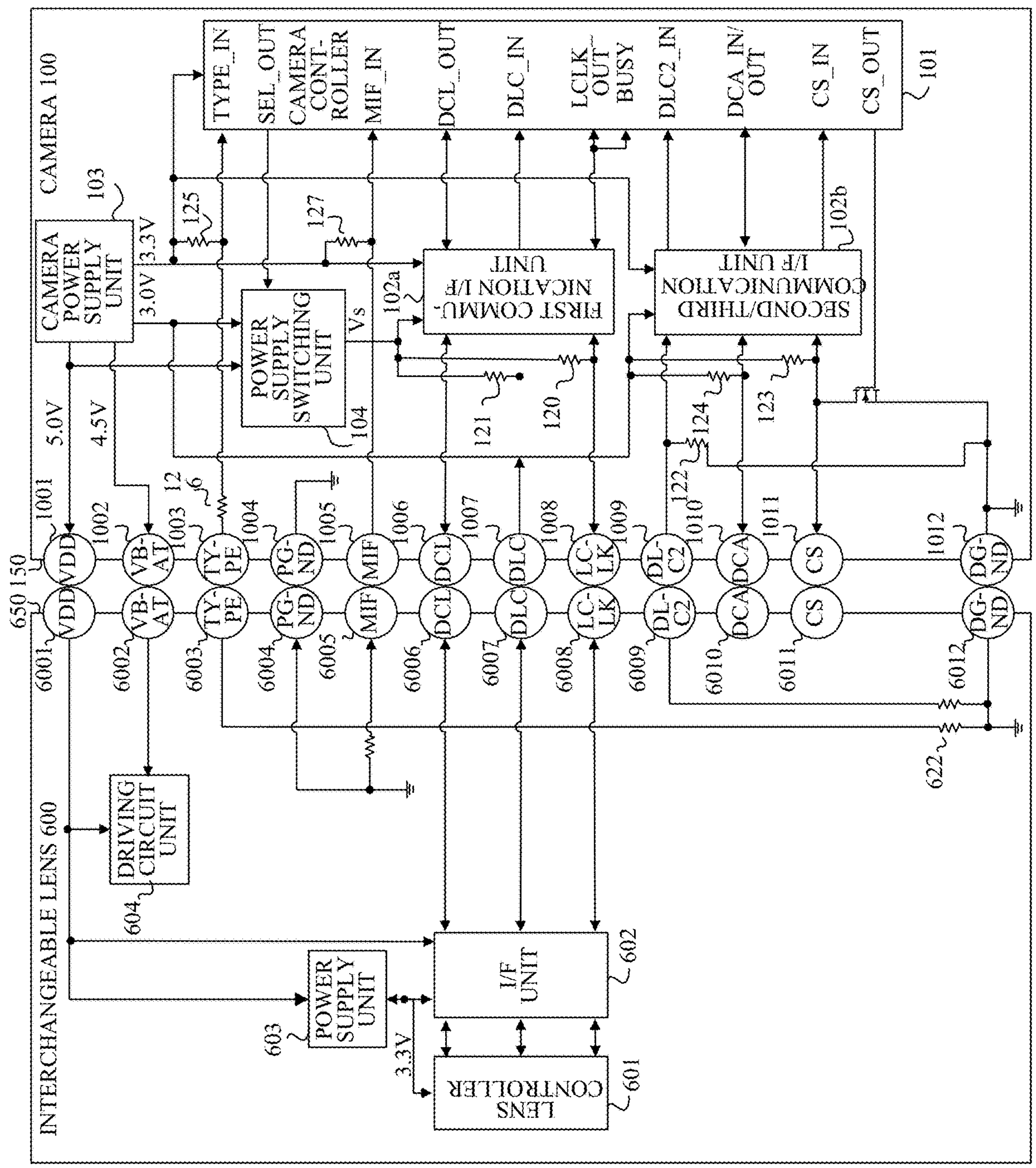
FIG. 5 illustrates circuit configurations of the camera and a third lens apparatus according to this embodiment.

Referring now to FIG. 5, a description will be given of the interchangeable lens 600 that is directly attached to the camera 100. FIG. 5 is a circuit configuration diagram of the camera 100 and the interchangeable lens (third lens apparatus) 600, and illustrates the interchangeable lens 600 connected to the camera 100. The interchangeable lens 600 cannot perform the second communication or the third communication with the camera 100, but can perform the first communication. The first communication is performed using the clock synchronous communication.

The mount part 650 has the same shape as the mount part 250, and the arrangement of the electrical contacts 6001 to 6012 provided to the mount part 650 is the same as that of the electrical contacts 2001 to 2012 in the interchangeable lens 200. A lens controller 601 as the communicator controls an output of the electrical contact provided to the mount part 650 and processes a signal input to the electrical contact, thereby controlling communications between the camera 100 and the interchangeable lens 600.

A lens power supply unit 603 generates a power supply having a predetermined voltage from the power supply supplied from the camera 100 and supplies power supply to the lens controller 601 and a lens-side communication I/F unit 602. The electrical contact 6001 is a terminal used to supply power (control power) used for communications performed between the camera 100 and the interchangeable lens 600 and other control calculations, from the power supply unit 103 of the camera 100 to the interchangeable lens 600. The electrical contact 6001 will also be referred to as a VDD terminal 6001 hereinafter. In this embodiment, the voltage (VDD voltage) of power supplied to the interchangeable lens 600 by the VDD terminal 6001 is 5.0V.

The power (driving power) used for operating a driving system (driving circuit unit 604) such as a motor is supplied from the camera 100 via the electrical contact 6002. The electrical contact 6002 will also be referred to as a VBAT terminal 6002 hereinafter. In this embodiment, the voltage of power supplied to the interchangeable lens 600 by the VBAT terminal 6002 is 4.5V. The VDD terminal and the VBAT terminal will be collectively referred to as a power supply system terminal.

The electrical contact 6012 is a terminal that grounds the communication control system circuit in the interchangeable lens 600 or a ground terminal corresponding to the VDD terminal. The electrical contact 6012 will also be referred to as a DGND terminal 6012 hereinafter.

The electrical contact 6004 is a terminal for grounding a driving system circuit such as a motor installed on the interchangeable lens 600, or a ground terminal corresponding to the VBAT terminal. The electrical contact 6004 will also be referred to as a PGND terminal 6004 hereinafter. The DGND terminal and the PGND terminal will be collectively referred to as a ground terminal.

The electrical contact 6005 is a terminal for detecting that the interchangeable lens 200 is attached to the camera 100. The camera controller 101 detects an attachment and a detachment of the interchangeable lens 600 to and from the camera 100 according to the voltage level of the electrical contact 1005. The electrical contact 6005 will also be referred to as an MIF terminal 6005 hereinafter.

The electrical contact (predetermined electrical contact) 6003 is a terminal (TYPE terminal) used to determine the type of the interchangeable lens attached to the camera 100 directly or via the intermediate adapter. The electrical contact 6003 is pulled down to the same level as the DGND terminal 6012 via a resistor 622 in the interchangeable lens 600. In other words, the electrical contact 6003 is not used for the power supply from the camera 100 or for communication with the camera 100, and is connected to the ground via the resistor 622.

The resistance value of the resistor 622 is different from that of the resistor 222 of the interchangeable lens 200. The resistance value of the resistor 622 may be closer to that of the resistor 422 than that of the resistor 222. In this embodiment, the resistance value of the resistor 622 is the same as that of the resistor 422. Thereby, the voltage of the electrical contact (TYPE terminal) 1003 can be made different between when the interchangeable lens 600 is attached to the camera 100 and when the interchangeable lens 200 is attached. Then, the voltage of the electrical contact 1003 can be made closer (equal) between when the interchangeable lens 600 is attached to the camera 100 and when the interchangeable lens 300 is attached.

The camera 100 can determine the type of the interchangeable lens based on the voltage of the electrical contact (first electrical contact) 1003 of the camera 100 when the interchangeable lens is attached, and makes different power to be supplied to the interchangeable lens according to the type of the interchangeable lens. The electrical contact (predetermined electrical contact) 6003 of the interchangeable lens 600 is connected to the electrical contact 1003 when the interchangeable lens 600 is mounted on the camera 100.

The electrical contacts 6006 to 6008 are terminals used for the first communication. The electrical contact 6009 is pulled down to the same level as the DGND terminal 6012 via a resistor. The camera 100 has an electrical contact (second electrical contact) 1009 that is used for data communication with the interchangeable lens 200 and is not used for data communication with the interchangeable lens 300. When the interchangeable lens 600 is mounted on the camera 100, the electrical contact 6009 connected to the electrical contact 1009 is connected to the ground via the resistor. Since the interchangeable lens 600 does not perform the second communication, the electrical contact 6009 is an originally unnecessary electrical contact that may not be provided. However, such a circuit configuration can prevent an undefined value from being input to DLC2_IN of the camera controller 101. If the camera 100 performs processing such as switching DLC2_IN to an output depending on whether or not there is the second communication, the electrical contact 6009 may not be provided.

The electrical contacts 6010 and 6011 are not connected to any part in the interchangeable lens 600. This is because the interchangeable lens 600 cannot perform the third communication. Therefore, the electrical contacts 6010 and 6011 may not be provided with the electrical contacts. The electrical contacts 6010 and 6011 may be grounded via a resistor like the electrical contact 6009.

The interchangeable lens 600 has an operation member operable by the user, and may have an operation member different from the operation member for adjusting the zoom position and the focus position. Such an operation member can change a setting of any of the F-number (aperture position), shutter speed, ISO speed, exposure amount correction, etc., which can be adjusted by the camera 100. The user can change these settings while viewing through the viewfinder.

Functions of Type Terminal

Referring now to FIGS. 6A to 6E, a description will be given of functions of the TYPE terminal 1003. FIGS. 6A to 6E are schematic diagrams of peripheral circuits of the TYPE terminal 1003. Now assume that the power supply voltage with which the TYPE terminal 1003 is pulled up in the camera body is 3.3V. A resistor 125 has a resistance value of 100 kΩ, a resistor 126 has a resistance value of 1 kΩ, the resistor 222 has a resistance value of 33 kΩ, and the resistor 622 has a resistance value of 300 kΩ. It is assumed that the voltage value input to the TYPE_IN terminal 101*a* is converted into a digital signal with a resolution of 10 bits by an unillustrated AD converter.

Figure 6A:
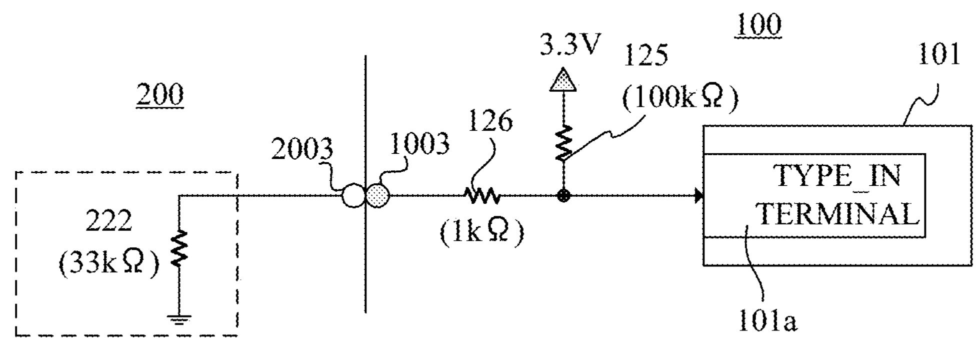
FIGS. 6A to 6E schematically illustrate peripheral circuits of a TYPE terminal according to this embodiment.

FIG. 6A illustrates a peripheral circuit of the TYPE terminal 1003 when the interchangeable lens 200 is attached to the camera 100. In this case, the value input to the TYPE_IN terminal 101*a* of the camera controller 101 is a value obtained by A/D-converting the voltage value obtained by dividing the power supply voltage (3.3 V) by the resistors 125 and 222, and is approximately "0x0103".

Figure 6B:
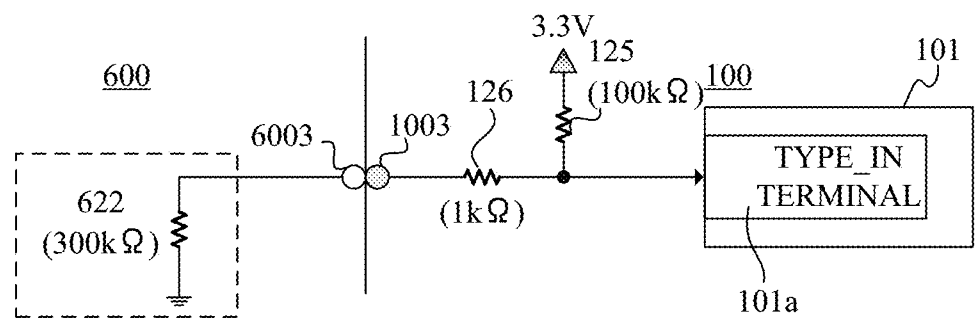

FIG. 6B illustrates a peripheral circuit of the TYPE terminal 1003 when the interchangeable lens 600 is attached to the camera 100. In this case, the value input to the TYPE_IN terminal 101*a* of the camera controller 101 is a value obtained by A/D-converting the voltage value obtained by dividing the power supply voltage (3.3 V) by the resistors 125 and 622, and is approximately "0x0300".

The resistance values of the resistors 222 and 622 that are made different from each other in this way can make different the value input to the TYPE_IN terminal 101_a_ according to the type of the interchangeable lens mounted on the camera 100. Hence, the camera controller 101 determines the type of interchangeable lens mounted on the camera 100 using the input value of the TYPE_IN terminal 101_a_. When the interchangeable lens 300 is attached to the camera 100 via the intermediate adapter 400, a value corresponding to the resistance value of the resistor 422 of the intermediate adapter 400 is input to the TYPE_IN terminal 101_a_. In other words, when the resistance values of the resistors 422 and 622 are made equal, the value input to the TYPE_IN terminal 101_a_ of the camera controller 101 is a value obtained by A/D-converting the voltage value obtained by dividing the power supply voltage (3.3 V) by the resistors 125 and 422, and is approximately "0x0300".

However, if some abnormality occurs in the connection state between the TYPE terminals 1003 and 2003, an unexpected value may be input to the TYPE_IN terminal 101_a_. If the camera controller 101 determines that an interchangeable lens is attached to the camera 100 despite some abnormality, a voltage outside the rating may be applied to the attached interchangeable lens. Accordingly, with reference to FIGS. 6C, 6D, and 6E, consider a case where some abnormality occurs in the connection state between the TYPE terminals 1003 and 2003.

Figure 6C:
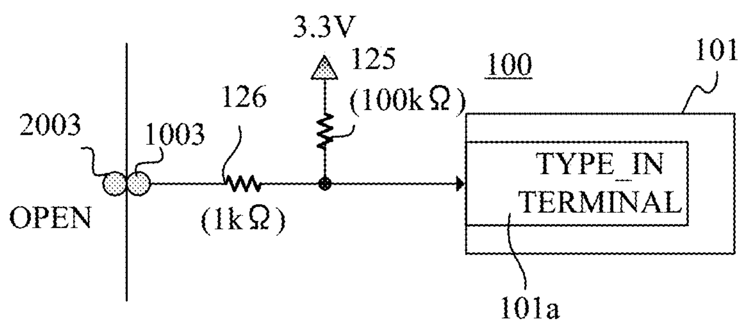
Figure 6D:
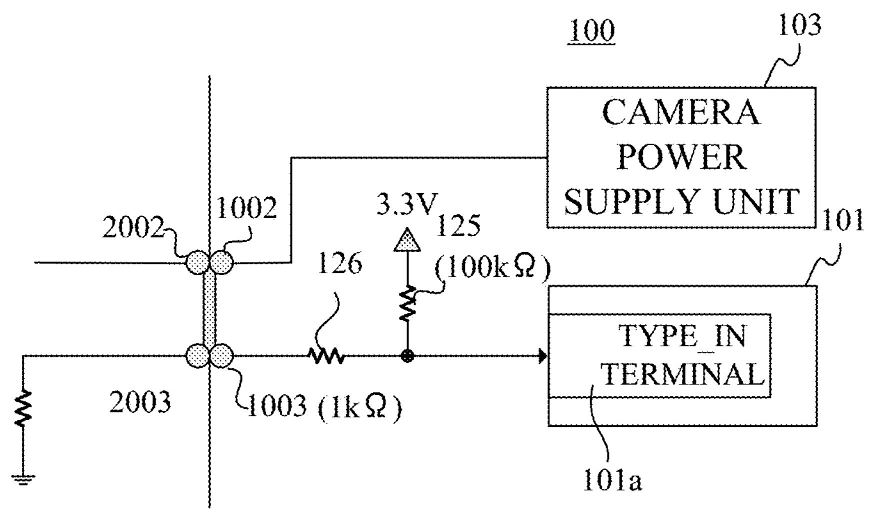
Figure 6E:
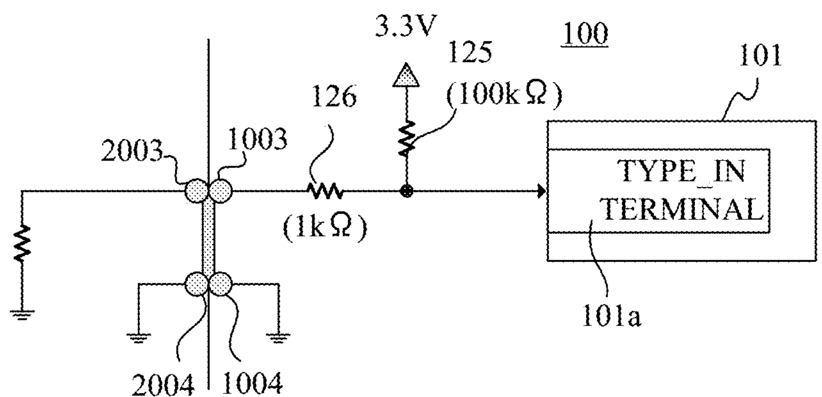

FIG. 6E illustrates a peripheral circuit of the TYPE terminal 1003 when the TYPE terminal 1003 and the PGND terminal 1004 are short-circuited. When the TYPE terminal 1003 and the PGND terminal 1004 are short-circuited, the voltage of the TYPE terminal 1003 becomes substantially equal to the voltage of the PGND terminal 1004 (reference potential (ground level) voltage of the VBAT voltage). At this time, the value input to the TYPE_IN terminal 101_a_ is determined by the voltage division ratio between the resistor 125 (100 kΩ) and the resistor 126 (1 kΩ) in the camera 100, and is approximately "0x000A".

As described above, when some abnormality occurs in the connection state between the TYPE terminals 1003 and 2003, the voltage of the TYPE terminal 1003 becomes substantially equal to the VBAT voltage or the voltage of the PGND terminal 1004. Accordingly, this embodiment sets a voltage range that does not include the VBAT voltage and the voltage of the PGND terminal 1004 to the range of the voltage of the TYPE terminal 1003 in which it is determined that the interchangeable lens is properly attached to the camera 100. Table 1 shows a correspondence table of the input value of the TYPE_IN terminal 101_a_ and the determination result of the attachment state by the camera controller 101 in this embodiment.

TABLE 1

| | 0x000~ 0x007F | 0x0080~ 0x017F | 0x0280~ 0x027F | 0x0280~ 0x037F | 0x0380~ 0x03FF |
|---|---|---|---|---|---|
| Determination result | Error | Interchangeable lens 200 | — | Interchangeable lens 300 Interchangeable lens 600 | Error |
| Communication voltage | — | 3.0 V | — | 5.0 V | — |

FIG. 6C illustrates a peripheral circuit of the TYPE terminal 1003 when the TYPE terminals 1003 and 2003 do not contact each other due to a poor contact or the like even though the interchangeable lens or the intermediate adapter has been attached to the camera 100. In this case, the voltage value input to the TYPE_IN terminal 101_a_ is determined only by the resistor 125 (100 kΩ) in the camera 100, and the A/D converted value is approximately "0x03FF".

FIG. 6D illustrates a peripheral circuit of the TYPE terminal 1003 when the TYPE terminals 1003 and the VBAT terminal 1002 are short-circuited. Now consider a case where the type of the interchangeable lens attached to the camera 100 is determined before power is supplied to the VBAT terminals 1002 and 2002. When the voltages of the VBAT terminals 1002 and 2002 when no power is supplied are the same as the PGND terminal and the TYPE terminals 1003 and the VBAT terminal 1002 are short-circuited, the voltage of the TYPE terminal 1003 becomes substantially equal to that of the PGND terminal. At this time, the value input to the TYPE_IN terminal 101_a_ is determined by the voltage division ratio between the resistors 125 (100 kΩ) and 126 (1 kΩ) in the camera 100, and is approximately "0x000A".

Now consider a case where the type of the interchangeable lens mounted on the camera 100 is determined after power is supplied to the VBAT terminals 1002 and 2002. In this case, when the TYPE terminals 1003 and the VBAT terminal 1002 are short-circuited, the VBAT voltage (4.5 V in this embodiment) is applied to the TYPE terminal 1003. At this time, the value input to the TYPE_IN terminal 101_a_ is approximately "0x03FF".

As shown in Table 1, if the input value of the TYPE_IN terminal 101_a_ is within the range of "0x0080 to 0x017F", the camera controller 101 determines that the interchangeable lens 200 is attached to the camera 100. "0x0080 to 0x017F" is the input value of the TYPE_IN terminal 101_a_ corresponding to the voltage within the first voltage range in which the voltage of the TYPE terminal 1003 does not include the VBAT voltage or the voltage of the PGND terminal 1004. Therefore, the camera controller 101 determines that the interchangeable lens 200 (the first type of interchangeable lens) is attached to the camera 100 only when the interchangeable lens 200 is properly attached to the camera 100. When it is determined that the interchangeable lens 200 is attached, the camera controller 101 performs the first communication with the interchangeable lens 200 at the communication voltage of 3.0V.

Similarly, if the input value of the TYPE_IN terminal 101_a_ is within the range of "0x0280 to 0x037F", the camera controller 101 determines that the interchangeable lens 300 or 600 is attached to the camera 100. "0x0280 to 0x037F" is the input value of the TYPE_IN terminal 101_a_ corresponding to the case where the voltage of the TYPE terminal 1003 is within the second voltage range that does not include the first voltage range, the VBAT voltage, or the voltage of the PGND terminal 1004. Therefore, only when the interchangeable lens 300 or 600 is properly attached to the camera 100, the camera controller 101 determines that one of the interchangeable lenses 300 and 600 (interchangeable lens of a type different from the first type) has been attached to the camera 100. When it is determined that either the interchangeable lens 300 or 600 is attached, the camera controller 101 performs the first communication with the attached interchangeable lens at the communication voltage of 5.0V.

When the input value of the TYPE_IN terminal 101*a* is within the range of "0x0000 to 0x007F", the camera controller 101 determines that there is some abnormality in the attachment state between the camera 100 and the interchangeable lens or the intermediate adapter. "0x0000 to 0x007F" is the input value of the TYPE_IN terminal 101*a* corresponding to the case where the voltage of the TYPE terminal 1003 is a fourth voltage range that includes the voltage of the PGND terminal 1004 and does not include the first or the second voltage range. In this case, the camera controller 101 does not communicate with the interchangeable lens attached to the camera body. Thereby, a voltage outside the rating can be prevented from being applied to the interchangeable lens or the intermediate adapter when the abnormality occurs in the connection state of the TYPE terminal.

If the input value of the TYPE_IN terminal 101*a* is within the range of "0x0380 to 0x03FF", the camera controller 101 determines that there is some abnormality in the attachment state between the camera 100 and the interchangeable lens or the intermediate adapter. "0x0380 to 0x03FF" is the input value of the TYPE_IN terminal 101*a* corresponding to the case where the voltage of the TYPE terminal 1003 is the third voltage range that includes the VBAT voltage and does not include the first or second voltage range. In this case, the camera controller 101 does not communicate with the interchangeable lens attached to the camera body. Thereby, the voltage outside the rating can be prevented from being applied to the interchangeable lens or the intermediate adapter when the abnormality occurs in the connection state of the TYPE terminal.

As described above, in this embodiment, when the interchangeable lens 200 is attached to the camera 100, the voltage of the first electrical contact is within the first voltage range. When the interchangeable lens 300 is mounted on the camera 100, the voltage of the first electrical contact is within the second voltage range. When the interchangeable lens 600 is mounted on the camera 100, the voltage of the first electrical contact is within the second voltage range. When the third lens apparatus is attached to the camera 100, the interchangeable lens 600 is supplied with the same voltage by the camera 100 as that when the interchangeable lens 300 is attached to the camera 100.

If the communication voltages of the first communication of the interchangeable lenses 300 and 600 from the camera 100 are equal to each other, the resistance value of the resistor 422 and the resistance value of the resistor 622 may be made different from each other so as to distinguish the interchangeable lenses 300 and 600 from each other. If the resistance values are made different, the input values of the TYPE_IN terminal 101*a* are made different, and the input value ranges of the determination reference are made different, whether the attached interchangeable lens is the interchangeable lens 300 or 600 can be identified.

Type of Communication Method

Next follows a description of the first communication method among the first communication, the second communication, and the third communication. When the interchangeable lens 200 is attached to the camera 100, the first communication between the interchangeable lens 200 and the camera 100 is performed by the asynchronous communication as the first communication method or the clock synchronous communication as the second communication method. More specifically, just after the interchangeable lens 200 is attached, the communication with the camera 100 is performed only by the clock synchronous communication, and then the communication is shifted to the asynchronous communication.

On the other hand, when the interchangeable lens 300 is attached to the camera 100 via the intermediate adapter 400 and when the interchangeable lens 600 is attached to the camera 100, the first communication between the interchangeable lenses 300 and 600 and the camera 100 is performed by the clock synchronous communication. However, since the interchangeable lenses 300 and 600 do not support the asynchronous communication, they cannot communicate with the camera 100 via the asynchronous communication.

First, the camera 100 communicates by the clock synchronous communication regardless of the attached interchangeable lens. Here, when ID information (individual information) of the attached interchangeable lens is communicated and the support of the asynchronous communication is recognized as in the interchangeable lens 200, the communication method shifts to the asynchronous communication. For the interchangeable lens such as the interchangeable lenses 300 and 600 that cannot support the first communication method, the communication by the clock synchronous communication continues. This may be determined only by the above TYPE terminal, or may be determined by the above ID information in addition to the TYPE terminal. The second voltage (5.0 V) is set to the interchangeable lenses 300 and 600 based on the determination result using the TYPE terminal described above.

After the ID information is communicated, the interchangeable lens 600 sends to the camera 100 information indicating the presence or absence of the operation member capable of changing the setting of any one of the F-number, the shutter speed, the ISO speed, and the exposure correction amount in response to the information request from the camera 100. In other words, the lens controller (communicator) 601 in the interchangeable lens 600 responds to the first information request received from the camera 100 when the interchangeable lens 600 is attached to the camera 100 using the second communication method, and sends the individual information of the interchangeable lens 600 to the camera 100. Then, the lens controller 601 sends information indicating the presence or absence of the operation member to the camera 100 in response to the second information request received from the camera 100 after sending the individual information.

Figure 7A:
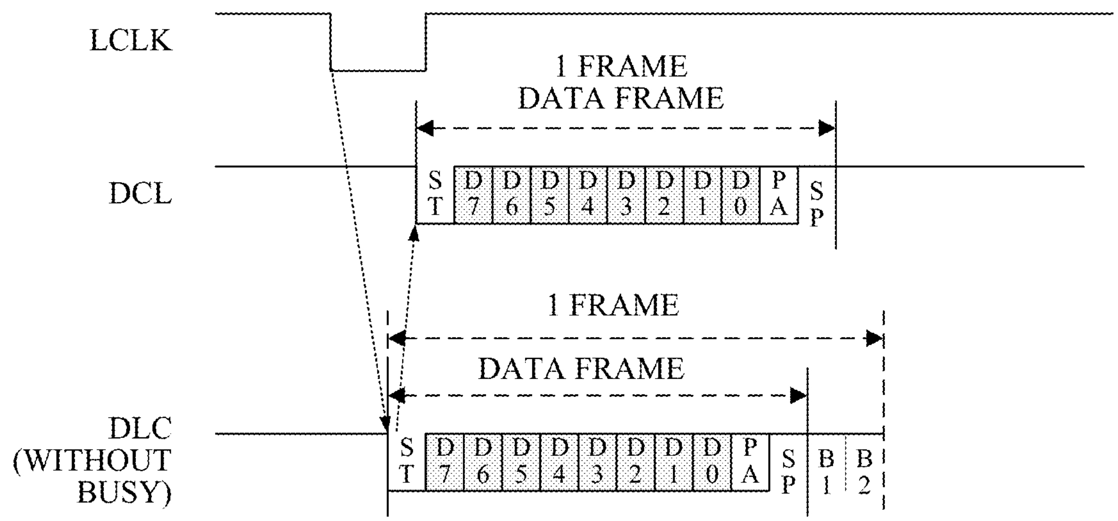
FIGS. 7A to 7C explain an asynchronous communication according to this embodiment.
Figure 7B:
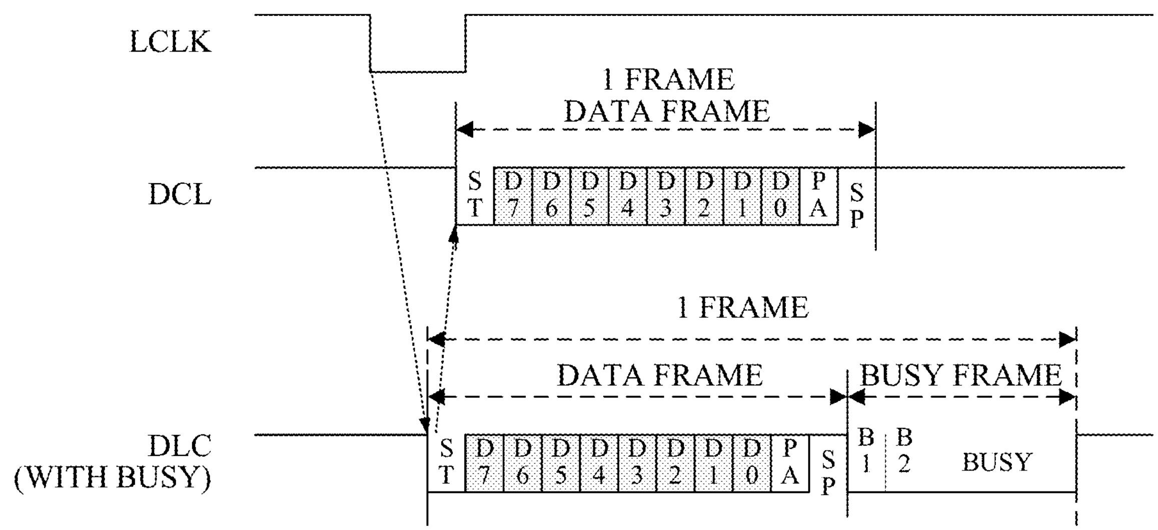
Figure 7C:
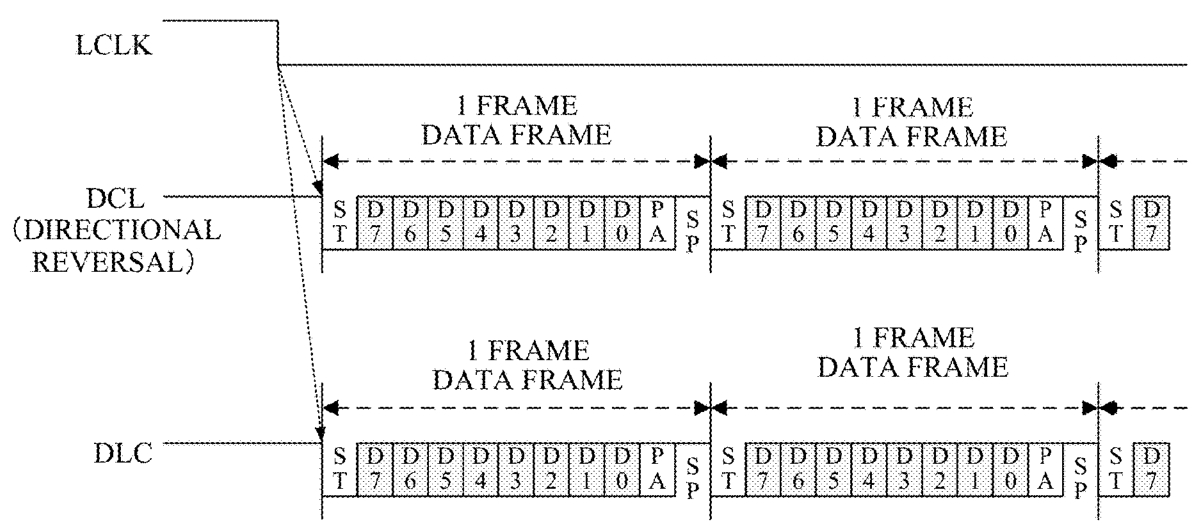

Referring now to FIGS. 7A to 7C, a description will be given of the first communication method. The first communication method is the asynchronous communication. However, this embodiment illustrates an example optimized for the communication between the camera and the lens instead of the general asynchronous communication. The communication is made using a signal line LCLK that can switch the high level (High) and the low level (Low) of the voltage, a DCL channel that transmits data from the camera 100 to the interchangeable lens, and a DLC channel that transmits data from the interchangeable lens to the camera. The signal line LCLK is a communication line formed via the electrical contact 1008, the DCL channel is a communication line formed via the electrical contact 1008, and the DLC channel is a communication line formed via the electrical contact 1007.

FIGS. 7A to 7C are explanatory diagrams of the asynchronous communication. As illustrated in FIG. 7A, the camera 100 changing the voltage level of the signal line LCLK from High to Low becomes a notice that a data frame (DataFrame) having a plurality of continuous data can be transmitted from the interchangeable lens 200 to the camera 100. The transmission of the data frame starts when the lens controller 201 detects that the voltage level of the signal line LCLK is switched from High to Low. One data frame consists of data from the start bit ST to the stop bit SP. On the other hand, for the camera controller 101, in response to detecting the start bit from the DLC channel, the data frame from the start bit to the stop bit is transmitted via the DCL channel.

FIG. 7B illustrates a case in which a busy signal is superimposed after the data transmission through the DLC for FIG. 7A. While the busy signal is being output, the camera controller 101 sets the signal line LCLK to the Low level and cannot request the next data frame. Although the communication speed is lower than when busy is not superimposed, it is effective when the lens wants to perform the next communication after performing necessary processing according to the communication content.

FIG. 7C illustrates a case in which the data transmission direction of the DCL channel is reversed and data is transmitted from the interchangeable lens to the camera 100 similar to the DLC channel. This is effective in sending a large amount of data from an interchangeable lens.

Thus, the first communication method switches a plurality of communication modes, lowers the communication speed when processing such as the calculation in the interchangeable lens is prioritized, and can maximize the bandwidth when a large amount of data is to be transmitted.

Figure 8:
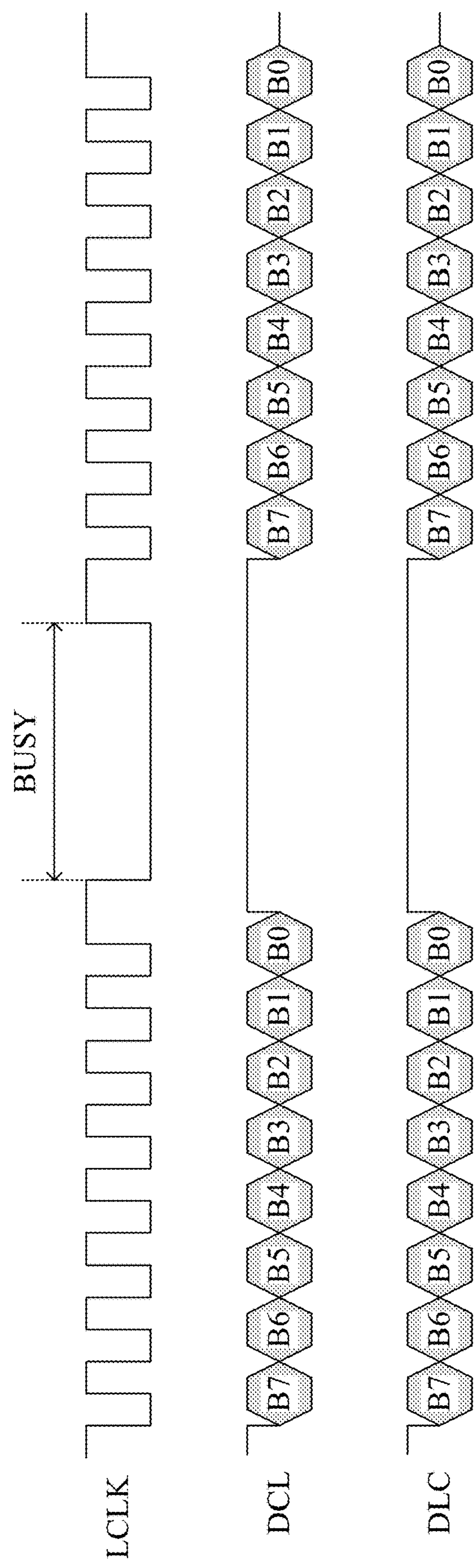
FIG. 8 explains a clock synchronous communication according to this embodiment.

Referring now to FIG. 8, a description will be given of the second communication method. The second communication method is the clock synchronous communication in which data is transmitted and received in synchronization with a clock signal. FIG. 8 explains the clock synchronous communication. A communication is made using the signal line LCLK, the DCL channel, and the DLC channel, similar to the first communication method. A clock signal generated by the camera controller 101 is superimposed on the signal line LCLK, a data frame (B7 to B0) having a predetermined data amount is transmitted in synchronization with it, and the Busy signal is superimposed on the signal line LCLK with the transmission of one data frame.

The communication can be made without the busy signal, similar to FIG. 7A, but in the case of the clock synchronization, the interchangeable lens needs to transmit and receive data in synchronization with the clock transmitted from the camera 100. Therefore, the busy can be eliminated only when it can be guaranteed that the processing time in the interchangeable lens is completed by the next clock reception.

Since the clock signal is output from the camera and the DLC must be output in synchronization with it, it is necessary to set the bit rate in consideration of the propagation delay of the communication. If the delay amount is larger relative to the bit rate, the DLC cannot be output in synchronization with the clock and the communication fails. Particularly in a system in which a plurality of contacts are connected, the propagation delay may increase due to the contact resistance or the like, so it is necessary to set the bit rate with a margin.

Thus, the asynchronous communication has a higher degree of freedom in communication timing than that of the clock synchronous communication and is more suitable for frequent data transmissions and receptions or transmissions of a large amount of data than the clock synchronous communication. The asynchronous communication has a higher communication speed than that of the clock synchronous communication. Thus, the CPU and peripheral circuits constituting the lens controller 201 mounted on the interchangeable lens 200 are likely to be larger than the lens controllers 301 and 601 mounted on the interchangeable lenses 300 and 600. Therefore, in the interchangeable lenses 300 and 600, design restrictions of the imaging optical system caused by securing the footprints of the CPU and peripheral circuits are less likely to occur than in the interchangeable lens 200. The cost can be reduced as compared with the CPU and peripheral circuits of the interchangeable lens 200.

The mount structure, circuit configuration, and communication method of interchangeable lens 600 have been described above. The interchangeable lens 600 has an imaging optical system 680 having a relatively short backfocus. Thus, the CPU and peripheral circuits that are not compatible with the asynchronous communication but are compatible with the clock synchronous communication can suppress the footprint and cost increase while ensuring the optical design freedom.

Unlike the interchangeable lens 200, the interchangeable lens 600 pulls down the electrical contacts (TYPE terminal, predetermined electrical contact) 6003 in the interchangeable lens 600 to the same level as the DGND terminal 6012 via the resistor 622. Thereby, the communication voltage of the first communication becomes the second voltage (5.0V) similar to the interchangeable lens 300. In other words, when the interchangeable lens 600 is attached to the camera 100, the interchangeable lens 600 is supplied with the same voltage from the camera 100 as that when the interchangeable lens 300 is attached to the camera 100.

The interchangeable lens 600 is particularly suitable for an optical system (wide-angle lens) whose 35 mm equivalent focal length at the telephoto end is 40 mm or less, and an optical system (macro lens) having a lateral magnification $\beta$ that satisfies $\beta \geq 0.5$ when focused on the shortest distance (when focused on the shortest distance at the wide-angle end in the case of a zoom lens). These lenses are less likely to need the asynchronous communication such as the high-speed AF and the followability to a dynamic object, and even if they only support the clock synchronous communication, an imaging problem is unlikely to occur. In addition, the interchangeable lens 600 is suitable for an interchangeable lens that does not transmit correction data for image corrections having a large data capacity to the camera 100. Although it takes a longer time to send the correction data when it does not support the asynchronous communication, this problem does not occur because the lens is unlikely to send the correction data. The interchangeable lens 600 is also suitable for other interchangeable lenses for which sufficient performance can be expected only by the clock synchronous communication.

As described above, the lens apparatus according to this embodiment is the lens apparatus (interchangeable lens 600 as the third lens apparatus) that is attachable to and detachable from the image pickup apparatus (camera 100). The lens apparatus includes an imaging optical system 680, a first-shaped mount part 650 engageable with the mount part 150 of the image pickup apparatus, and a communicator (lens controller 601) communicable with the image pickup apparatus. Any of a plurality of lens apparatuses including the first lens apparatus (interchangeable lens 200) and the second lens apparatus (interchangeable lens 300) is attachable to and detachable from the image pickup apparatus directly or via the intermediate adapter 400 or 500. The first lens apparatus has a mount part 250 engageable with the mount part of the image pickup apparatus, and communicable with the image pickup apparatus using the first communication method. The second lens apparatus has a second-shaped mount part 350 that is not engageable with the mount part of the image pickup apparatus, and is attachable to the image pickup apparatus via the intermediate adapter 400, and is communicable with the image pickup apparatus by the second communication method different from the first communication method. The communicator can communicate with the image pickup apparatus using the second communication method, and cannot communicate with the image pickup apparatus using the first communication method.

This embodiment can provide a lens apparatus and an imaging system, each of which can improve both the optical design freedom and the communication performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197785, filed on Oct. 30, 2019 which is hereby incorporated by reference herein in its entirety.

What is claimed is:

1. A lens apparatus attachable to and detachable from an image pickup apparatus, the lens apparatus comprising:

an imaging optical system;

a first-shaped mount part engageable with a mount part of the image pickup apparatus and including a plurality of electrical contacts; and a communicator communicable with the image pickup apparatus, wherein a predetermined electrical contact among the plurality of electrical contacts is not used to supply power from the image pickup apparatus or to communicate with the image pickup apparatus, and is grounded via a resistor, wherein the communicator is communicable with the image pickup apparatus using a clock synchronous communication method different from an synchronous communication method, and uncommunicable with the image pickup apparatus using the asynchronous communication method, wherein the image pickup apparatus supports both the clock synchronous communication method and the asynchronous communication method, and wherein the resistor grounding the predetermined electrical contact has a resistance value according to the type of the lens apparatus being a type which communicates with the image pickup apparatus at a first voltage using the clock synchronous communication method.

2. The lens apparatus according to claim 1, the first-shaped mount part is undetachable from the imaging optical system.

3. The lens apparatus according to claim 1, further comprising an operation member operable by a user, wherein the lens apparatus changes a setting of at least one of an F-number, a shutter speed, an ISO speed, and an exposure correction amount, when the operation member is operated while the lens apparatus is attached to the image pickup apparatus.

4. The lens apparatus according to claim 3, wherein the communicator sends individual information of the lens apparatus to the image pickup apparatus according to a first information request received from the image pickup apparatus when the lens apparatus is attached to the image pickup apparatus using the clock synchronous communication method, and wherein the communicator sends to the image pickup apparatus information on whether or not there is the operation member, according to a second information request received from the image pickup apparatus after the lens apparatus sends the individual information.

5. The lens apparatus according to claim 1, wherein a 35 mm equivalent focal length of the imaging optical system at a telephoto end is 40 mm or less.

6. The lens apparatus according to claim 1, wherein the following expression is satisfied:

$$\beta \geq 0.5$$

where β is a lateral magnification when focused on a shortest distance.

7. The lens apparatus according to claim 1, wherein the following expression is satisfied:

$$10 \leq d1 \leq 30$$

where d1 [mm] is a backfocus of the imaging optical system.

8. The lens apparatus according to claim 1, wherein the following expression is satisfied:

$$14 \leq d2 \leq 22$$

where d2 [mm] is a flange back of the lens apparatus.

9. The lens apparatus according to claim 1, wherein the communicator transmits lens ID information of the lens apparatus, which indicates that the asynchronous communication method is not supported, to the image pickup apparatus.

10. The lens apparatus according to claim 1, wherein the asynchronous communication method has a communication speed higher than that of the clock synchronous communication method.

11. An image pickup system comprising:

an image pickup apparatus including an image sensor; and a lens apparatus attachable to and detachable from the image pickup apparatus, wherein the lens apparatus includes:

an imaging optical system;

a first-shaped mount part engageable with a mount part of the image pickup apparatus and including a plurality of electrical contacts; and a communicator communicable with the image pickup apparatus, wherein a predetermined electrical contact among the plurality of electrical contacts is not used to supply power from the image pickup apparatus or to communicate with the image pickup apparatus, and is grounded via a resistor, wherein the communicator is communicable with the image pickup apparatus using a clock synchronous communication method different from a asynchronous communication method, and uncommunicable with the image pickup apparatus using the asynchronous communication method, wherein the image pickup apparatus supports both the clock synchronous communication method and the asynchronous communication method, and wherein the resistor grounding the predetermined electrical contact has a resistance value according to the type of the lens apparatus being a type which communicates with the image pickup apparatus at a first voltage using the clock synchronous communication method.

12. The image pickup system according to claim 11, wherein any one of a plurality of lens apparatuses including a first lens apparatus and a second lens apparatus is attachable to and detachable from the image pickup apparatus;

the first lens apparatus is attachable to and detachable from the image pickup apparatus directly or via a first intermediate adapter; and the second lens apparatus is attachable to and detachable from the image pickup apparatus via a second intermediate adapter, wherein the first lens apparatus includes a mount part engageable with the mount part of the image pickup apparatus, and is communicable with the image pickup apparatus using the asynchronous communication method, and wherein the second lens apparatus includes a second-shaped mount part that is not engageable with the mount part of the image pickup apparatus, and is communicable with the image pickup apparatus using the clock synchronous communication method different from the asynchronous communication method.

13. The image pickup system according to claim 12, wherein the image pickup apparatus is configured to determine a type of the lens apparatus based on a voltage of a first electrical contact of the image pickup apparatus when the lens apparatus is attached, and makes different a voltage of the power supplied to the lens apparatus according to the type of the lens apparatus, and wherein the predetermined electrical contact is connected to the first electrical contact when the lens apparatus is attached to the image pickup apparatus.

14. The image pickup system according to claim 13, wherein when the first lens apparatus is attached to the image pickup apparatus, the voltage of the first electrical contact is within a first voltage range, wherein when the second lens apparatus is attached to the image pickup apparatus, the voltage of the first electrical contact is within a second voltage range, and wherein when the lens apparatus is attached to the image pickup apparatus, the voltage of the first electrical contact is within the second voltage range.

15. The image pickup system according to claim 14, wherein the image pickup apparatus further comprises a resistor having a resistance value such that the voltage of the first electrical contact is within the second voltage range when the lens apparatus is attached to the image pickup apparatus.

16. The image pickup system according to claim 14, wherein when the lens apparatus is attached to the image pickup apparatus, the lens apparatus is supplied with the same voltage as that when the second lens apparatus is attached to the image pickup apparatus.

17. The image pickup system according to claim 11, wherein the image pickup apparatus includes a second electrical contact that is used for a data communication with the first lens apparatus and that is not used for a data communication with the second lens apparatus, and wherein an electrical contact connected to the second electrical contact when the lens apparatus is attached to the image pickup apparatus is grounded via a resistor.

18. The image pickup system according to claim 11, wherein an electrical contact of the image pickup apparatus used for the asynchronous communication method and an electrical contact of the image pickup apparatus used for the clock synchronous communication method are the same.

19. The image pickup system according to claim 11, wherein the communicator transmits lens ID information of the lens apparatus, which indicates that the asynchronous communication method is not supported, to the image pickup apparatus.

* * * * *